United States Patent [19]

Vykukal

[11] 4,091,464
[45] May 30, 1978

[54] SPACESUIT MOBILITY JOINTS

[75] Inventor: Hubert C. Vykukal, Los Altos, Calif.

[73] Assignee: The United States of America as represented by the Administrator of the National Aeronautics and Space Administration, Washington, D.C.

[21] Appl. No.: 753,965

[22] Filed: Dec. 23, 1976

[51] Int. Cl.² ............................................. A62B 17/00
[52] U.S. Cl. ..................................... 2/2.1 A; 285/235
[58] Field of Search ............................. 2/2.1 A, 2.1 R; 285/235, 236, 283, 114, 225

[56] References Cited

U.S. PATENT DOCUMENTS

| | | | |
|---|---|---|---|
| 2,433,768 | 12/1947 | Krupp | 2/2.1 A |
| 3,242,499 | 3/1966 | Fonda-Bonardi | 2/2.1 R |
| 3,405,406 | 10/1968 | Vykukal | 2/2.1 A |
| 3,411,157 | 11/1968 | Rabenhorst | 2/2.1 R |
| 3,421,158 | 1/1969 | Fonda-Bonardi | 285/262 X |
| 3,636,564 | 1/1972 | Vykukal | 2/2.1 A |
| 3,832,735 | 9/1974 | Elkins et al. | 2/2.1 A |

*Primary Examiner*—Alfred R. Guest
*Attorney, Agent, or Firm*—Darrell G. Brekke; John R. Manning

[57] ABSTRACT

Pressure suit mobility joints for use in interconnecting adjacent segments of an hermetically sealed spacesuit in which low torques, low leakage and a high degree of reliability are required. Each of the joints is a special-purpose joint characterized by substantially constant volume and low torque characteristics and includes linkages which restrain the joint from longitudinal distension and includes a flexible, substantially impermeable diaphragm of tubular configuration spanning the distance between pivotally supported annuli. The diaphragms of selected joints include rolling convolutions for balancing the joints, while various joints include wedge-shaped sections which enhance the range of motion for the joints.

33 Claims, 21 Drawing Figures

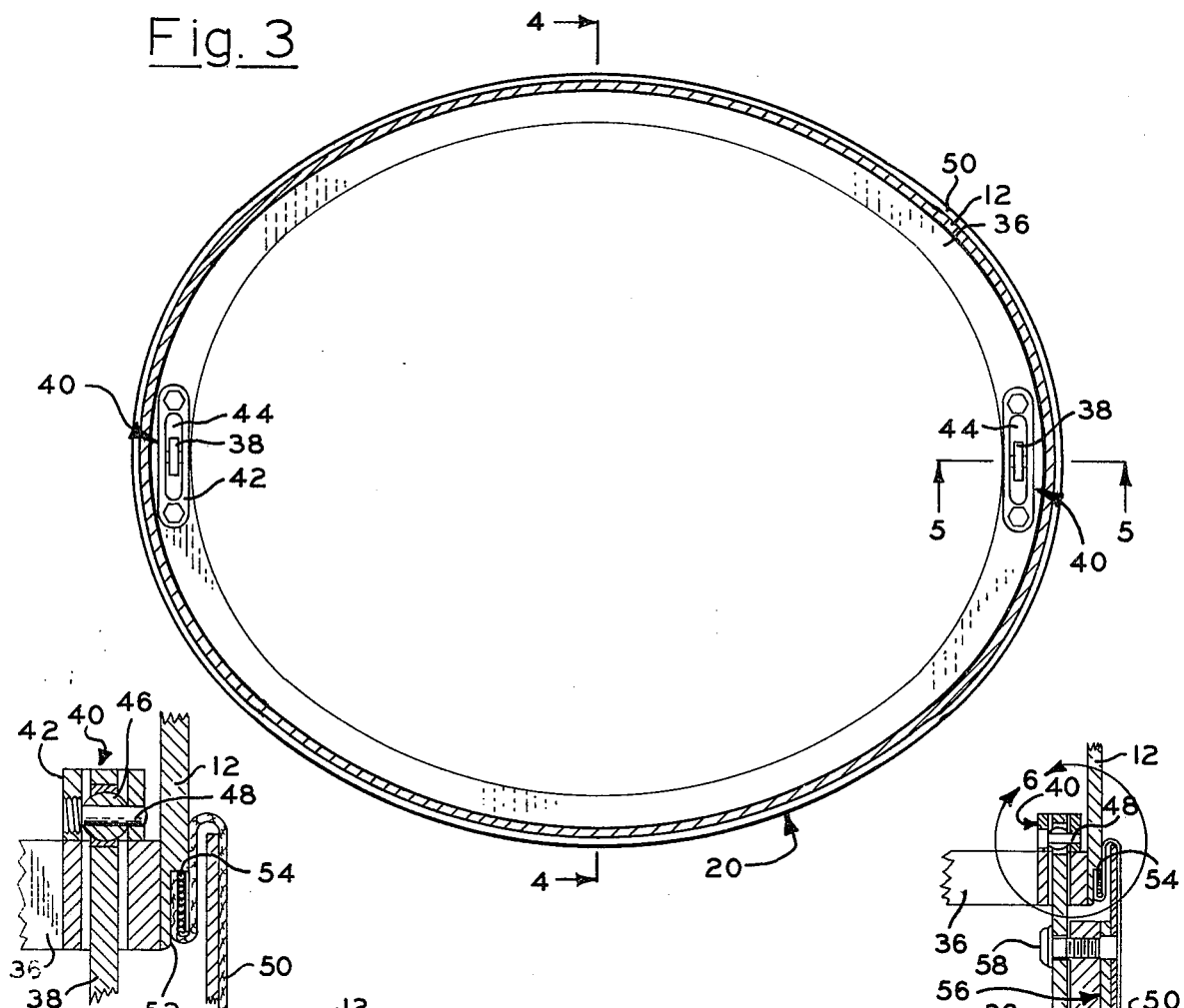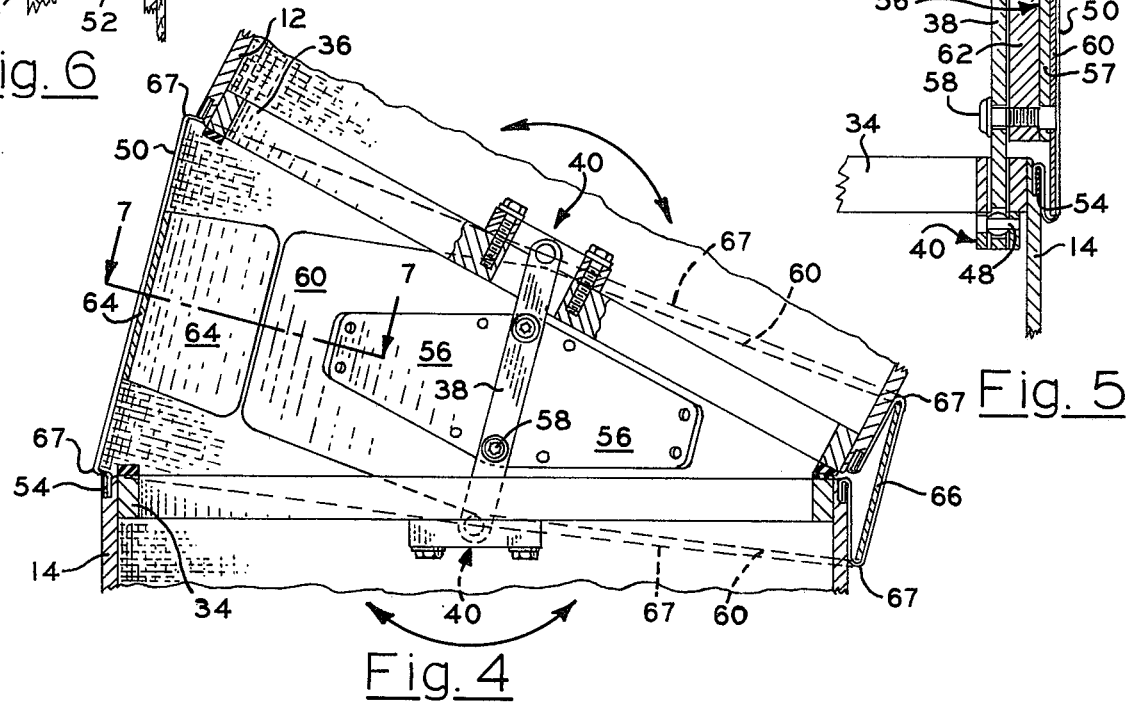

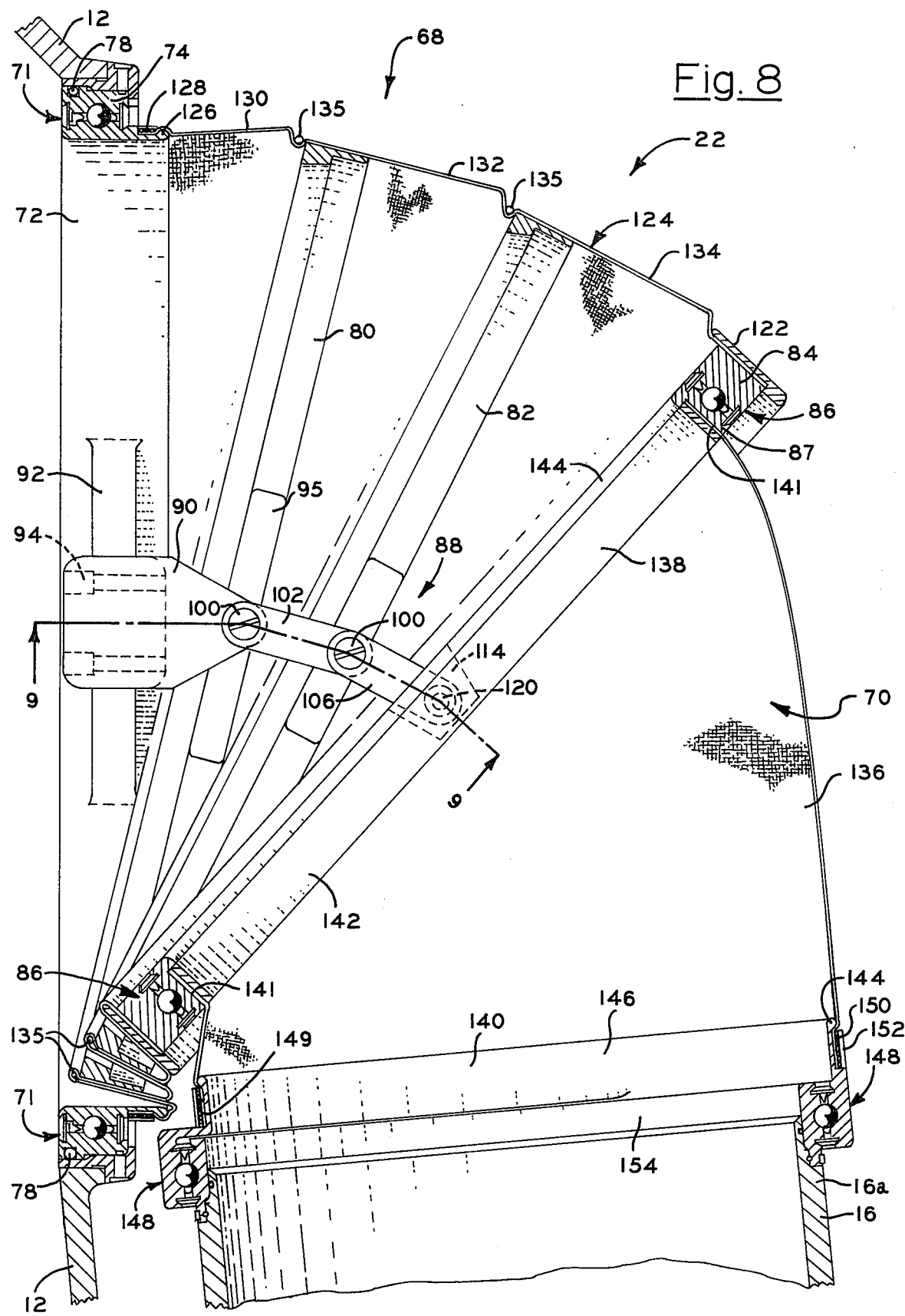

SPACESUIT MOBILITY JOINTS

ORIGIN OF THE INVENTION

The invention described herein was made by employees of the United States Government and may be manufactured and used by or for the government for governmental purposes without the payment of any royalties thereon or therefor.

BACKGROUND OF THE INVENTION

1. Field of the Invention

The invention relates generally to constant volume mobility joints particularly suited for use in interconnecting adjacent segments of an hermetically sealed pressure suit such as the so-called spacesuit.

2. Description of the Prior Art

Pressure suits, often referred to as diving suits, have long been employed for protecting divers at substantially great depths in positive pressure environments found beneath the sea. With man's entry into the exploration of celestial space, it has been found that pressure suits also have utility in negative pressure environments, such as often are found beyond the earth's atmosphere. Of course, pressure suits designed for use in the positive pressures of undersea environments are extremely bulky and generally of substantial mass, as typified by the diving suit shown in United States Letters Pat. No. 2,034,637. Consequently, due to the bulk and mass of diving suits, it has been found that they generally are not suitable for use in the exploration of celestial space.

In the relatively recent past, numerous attempts have been made to provide pressure suits particularly suited for use in celestial space environments, commonly referred to as spacesuits. Among such suits are those disclosed in United States Letters Pat. No. 3,405,406, which issued Oct. 15, 1968, and United States Letters Pat. No. 3,636,564, which issued to the instant inventor Jan. 25, 1972.

Generally speaking, spacesuit mobility is of utmost concern to the wearer, since a lack of mobility may seriously impair the success of a mission. In the past, joints of hard spacesuits have utilized molded convolutes, toroidal structures, link structures, multiple bearings, and gathered and pleated fabrics.

As can be appreciated by those familiar with the design and fabrication of pressure suits for use in celestial space environments, the joints of the suits of the prior art typically exhibit torque which increases proportionally with internal suit pressure. Additionally, such joints are not neutrally stable throughout their range defined by the limits of their throw. Consequently, the motion of a wearer of such a suit often is impaired, due to the effects of the torque, with attendant reduction in or even loss of mission capabilities. Additionally, such joints normally are not neutrally stable throughout their range of motion. For example, as is discussed in United States Letters Pat. No. 3,242,499, it has been found that an unrestrained bellows tubing will normally elongate and straighten when subjected to internal pressures which exceed the external pressures, and will, therefore, exhibit forces which oppose forces acting to flex the bellows joints. This characteristic of a bellows tubing may be of little consequence where bending forces are high, but where unrestricted flexibility is desired, such as in a spacesuit, use of typical bellows sections generally tends to be impractical. These and other difficulties, such as maintaining the integrity of the suit under pressure for long periods, are encountered when approaching the problem of providing for increased mobility through a use of the joints suggested by the prior art.

It is therefore the general purpose of the instant invention to provide in an hermetically sealed spacesuit improved mobility joints which are characterized by low torques, low leakage and high reliability throughout the full throw of the bending range thereof.

OBJECTS OF THE INVENTION

It is, therefore, an object of the instant invention to provide an improved mobility joint which overcomes the aforementioned difficulties and disadvantages.

Another object is to provide, for use in an hermetically sealed pressure suit, improved mobility joints.

Another object is to provide for use in an hermetically sealed pressure suit a constant volume mobility joint having low torques, low leakage, and high reliability characteristics.

Another object is to provide for use in an hermetically sealed pressure suit a constant volume mobility joint particularly suited for use in accommodating motion at selected joints of the suit.

Yet another object is to provide for use in connecting adjacent segments of hermetically sealed pressure suits special-purpose constant volume mobility joints which facilitate motion without exhibiting torque increasing proportionally with internal suit pressure.

Still another object is to provide constant volume mobility joints which are particularly useful in connection with the structure of a spacesuit, although not necessarily restricted in use thereto since the joint may be installed in pressure systems of general utility in terrestrial environments.

SUMMARY OF THE INVENTION

These and other objects and advantages are achieved through a use of a relatively thin, flexible film of fabric or fabric laminate, hereinafter referred to as a diaphragm, which functions as a retention layer and having formed therein rolling layers, hereinafter referred to as convolutions, which balance the joint in its axial directions, and restraining linkages which restrain the joints from distending longitudinally. The joints are geometrically designed to pivot about axes disposed in fixed coincidence with the crowns of the rolling convolutions in order to balance the internal pneumatic forces of the suit acting on the diaphragm.

IN THE DRAWINGS

FIG. 3 is a top plan view taken generally along lines 3—3 of FIG. 2.

FIG. 4 is a fragmented, side elevational view, on an enlarged scale, taken generally along lines 4—4 of FIG. 3.

FIG. 5 is a fragmented, vertically sectioned view, on an enlarged scale, taken generally along lines 5—5 of FIG. 3.

FIG. 6 is an enlarged, fragmentary view of the structure circumscribed by line 6 of FIG. 5.

FIG. 8 is a vertically sectioned, front elevational view of a shoulder joint shown in FIGS. 1 and 2.

DETAILED DESCRIPTION OF THE PREFERRED EMBODIMENTS

General Description

Figure 1:
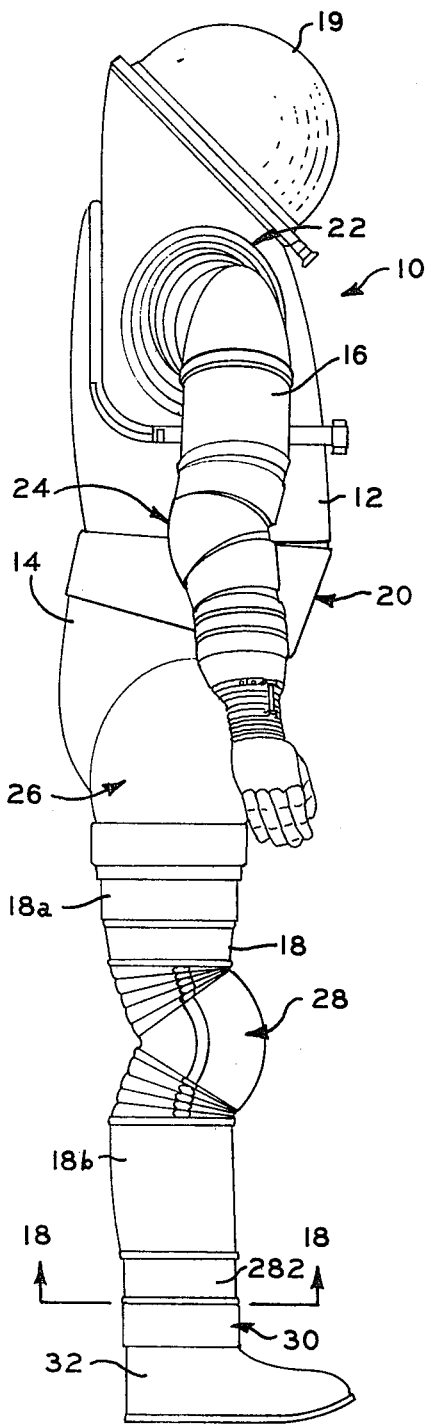
FIG. 1 is a side elevational view of a pressure suit having provided therein constant volume mobility joints which embody the principles of the instant invention.

Referring now to the drawings with more particularity, wherein like reference characters designate like or corresponding parts throughout the several views, there is shown in FIG. 1 a spacesuit, generally designated 10, particularly suited for use by explorers of celestial space.

The spacesuit 10 comprises an hermetically sealed pressure suit which serves to confine therein pressure greater than the pressure of its environment. As shown, the suit 10 includes a torso section, the upper portion of which is simply referred to as torso section 12, and a lower torso section, herein referred to as brief section 14. The torso section 12 and the brief section are joined by a closure member 15 which constitutes the subject matter of U.S. Pat. application No. 780,569, filed Mar. 23, 1977. Therefore, a more detailed description of the closure member is omitted in the interest of brevity. The suit 10, as shown, further includes arm sections 16 characterized by upper segments 16a and lower segments 16b. Similarly, the spacesuit 10 includes leg sections 18 characterized by upper segments 18a and lower segments 18b. Finally, the suit is closed by a transparent helmet 19 of known design. The torso of the spacesuit 10 is fabricated from a suitable rigid material such as laminations of fibrous and sheet material selected from a class of suitable synthetic resins. Since the particular material from which the torso, as well as the helmet 19, of the spacesuit is fabricated may be varied as desired, a detailed description thereof is omitted in the interest of brevity.

As will hereinafter be more fully appreciated, the various sections and segments of selected sections of the spacesuit are supported by mobility joints embodying the principles of the instant invention. More specifically, the torso section 12 and the brief section 14 are connected through an improved waist joint, generally designated 20, which embodies the principles of the instant invention. Similarly, the torso section and the arm section 16 are connected through an improved shoulder joint 22, which serves to accommodate motion of the arm sections relative to the torso section 12. Likewise, each of the arm sections 16 is provided with an improved elbow joint 24, the purpose of which is to permit the lower segment 16b to be moved relative to the upper segment 16a of the arm section 16. For purposes of connecting each of the leg sections 18 to the brief section 14, there is provided an improved hip joint, designated 26, which, also, embodies the principles of the instant invention. Each of the hip joints 26 is interposed between the brief section 14 and the upper leg section segment 18a. The upper segments and lower segments of the leg sections 18 are united at improved knee joints 28, while an ankle joint 30 embodying the principles of the instant invention is provided for connecting a boot 32 to the lowermost segment of each of the leg sections 18.

It is to be understood that the boot 32 is a walking boot which constitutes the subject matter of United States Pat. application No. 753,976, filed Dec. 23, 1976. Therefore, a more detailed description of the boot 32 is omitted in the interest of brevity.

As will hereinafter be discussed with more particularity, each of the aforementioned joints comprises a special-purpose, stabilized joint sealed by a pressure retention layer comprising a flexible, substantially impermeable diaphragm of a tubular configuration and restrained against longitudinal distension through pivotal linkages. With the exception of the knee joint 28, as will hereinafter become more readily apparent, the diaphragm of each of the joints includes at least one rolling convolution, the crown of which is coincident with the axis of the joint. The diaphragm serves to assure that no volumetric changes attend the bending of the joint, hence a balancing of the pneumatic forces acting on the joints is assured. Thus stability is achievable for all positions for the joints so that the forces required to effect bending of the joints remains substantially constant throughout the throw of the joint. As a practical matter, because of the fact that the volume of the various joints remains constant throughout the operation of the suit, the suit remains in a uniformly force balanced condition whereby mobility is enhanced.

Furthermore, in order to further enhance the range or limits of the throw of motion for the elbow joint and the knee joint, as will hereinafter be more fully appreciated, the joints include a "wedge" section or subassembly.

Finally, it also is important to note that the ankle joint 30 is supported for substantially omni-directional motion which affords a boot attached to a leg section of the suit the required mobility for walking on relatively rough surfaces.

Thus, it should be apparent that the suit 10 includes a plurality of similar balanced joints having enhanced pressure vessel force and volumetric control. This control is achieved in the absence of compression hooks, metal supports and, excepting the knee joint, center line restraint control cables, while the torque of the joints is essentially constant throughout the full range of motion for the joints. Moreover, where desired, multiple axes articulation is afforded selected joint assemblies, such as the ankle joint assemblies 30, through simple gimbal systems, as will hereinafter be more fully described.

The knee joint assembly 28, on the other hand, is similar to the elbow joint 24, as will hereinafter become more readily apparent, and in some respects is similar to the flexible joint described in United States Pat. application No. 3,832,735.

With the foregoing general description of the mobility joints, their purposes, and their differences in mind, a detailed description thereof is hereinafter provided in order to provide for a complete understanding of the invention.

Waist Joint

Figure 2:
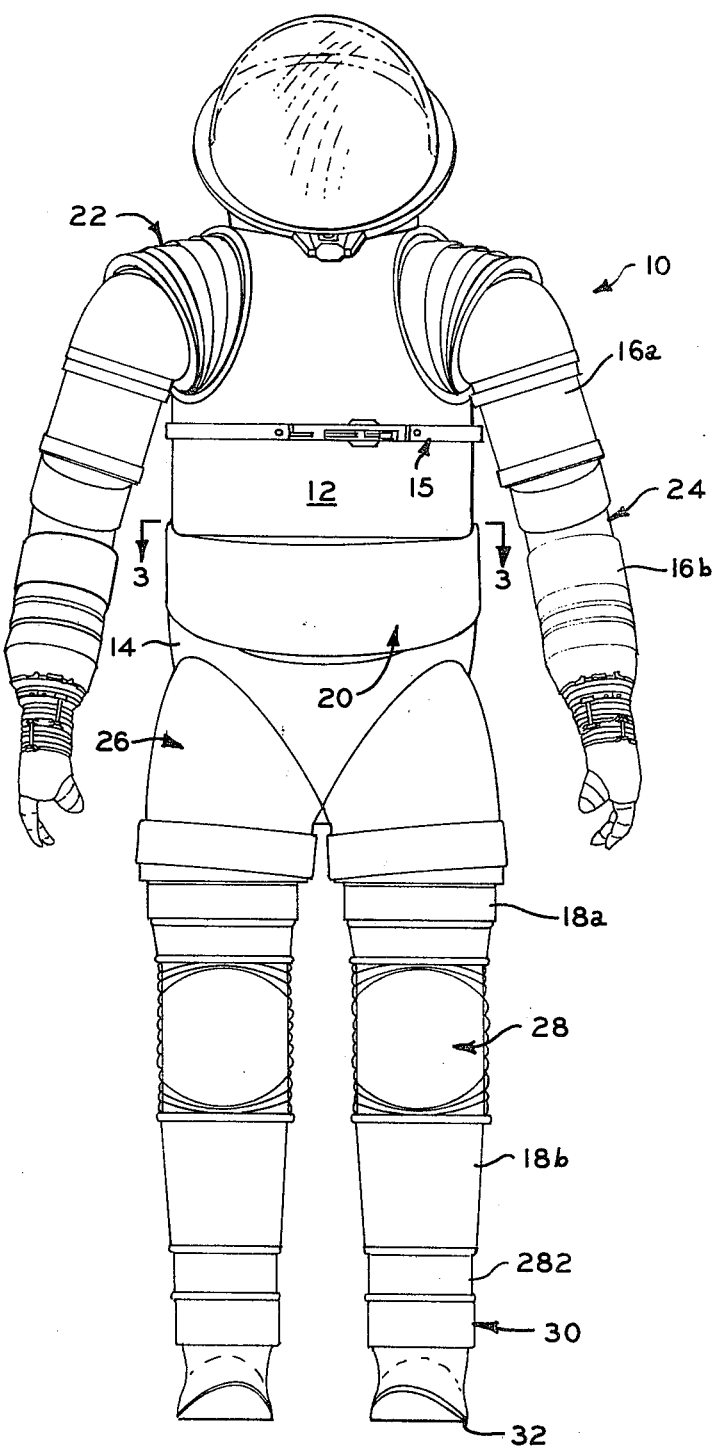
FIG. 2 is a front elevational view of the suit shown in FIG. 1.
Figure 7:
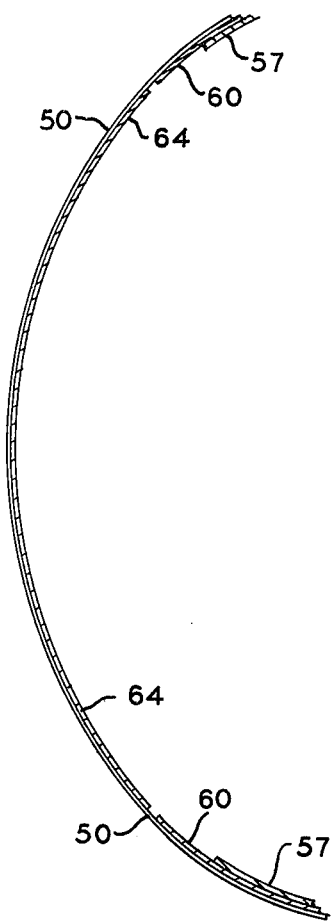
FIG. 7 is a fragmented, horizontally sectioned view taken along lines 7—7 of FIG. 4.

Turning now to FIGS. 1 and 2, it should be apparent that the waist joint 20, as hereinbefore mentioned, serves to connect the torso section 12 with the brief section 14, whereby the body of the spacesuit 10 is articulated for purposes of accommodating bending motion of a wearer at his waist.

With reference to FIG. 3, it should be appreciated that the waist joint 20 is of a substantially elliptical configuration for accommodating the shape of the torso of the wearer, while reducing bulk, insofar as it is possible to do so. As best shown in FIG. 4, the waist joint 20 includes a first rigid annulus 34 concentrically related to the brief section 14. Similarly, a second rigid annulus 36 is mated with the torso section 12 in concentric relation therewith. It is to be appreciated that the first annulus and second annulus are, in practice, formed of any suitable rigid material and are spaced apart a distance such that each annulus may be pivotally displaced about an axis paralleling the greatest diameter thereof for accommodating articular motion in the region of the waist of the pressure suit 10.

In order for the annuli, designated 34 and 36, to be pivotally supported against mutual displacement in axial directions, there is provided at each of the opposite sides of the joint a rigid link 38. Each of the links 38 is, in turn, connected with the annuli through a ball joint, hereinafter referred to as a monoball joint, generally designated 40, located at each of its opposite ends. In practice, the monoball joints 40 are connected by suitable brackets 42 secured to the annuli 34 and 36 through a use of suitable fasteners such as screw threaded bolts, not designated, received by internally threaded bores.

Each of the brackets 42, as a practical matter, includes a vertically oriented slot 44 within which is received one end portion of one of the links 38. A monoball 46, of known design and construction, is seated in and secured to the end portion of the link 38 while a pivot pin 48 is extended therethrough and received by the bracket for pivotally coupling the link 38 therewith. It is important to note that the waist joint 20 includes four monoball joints 40 and that the pivot pins 48 thereof are so disposed as to establish two pivotal axes extended in mutual parallelism with the major diameter of the waist joint.

As best illustrated in FIG. 4, there is extended between the first and second annuli 34 and 36 a diaphragm 50, the purpose of which is to provide an hermetic seal for the waist joint assembly 20. The diaphragm 50 is of a substantially tubular configuration and is formed of a relatively thin, impermeable material such as laminated layers of neoprene and Nomex. However, the particular material from which the diaphragm 50 is fabricated is varied as desired, therefore, a more detailed description of the diaphragm is omitted in the interest of brevity. However, it is to be understood that the diaphragm is characterized by a high degree of flexibility, substantial impermeability to gas, and a capability of being hermetically sealed to both the torso section and the brief section of the spacesuit.

As best illustrated in FIG. 6, one end portion of the diaphragm 50 is seated in an annular recess 52 provided about the lowermost end portion of the torso section 12 and is adhered thereto through a use of any suitable adhesive, such as neoprene, cement or the like. Extended about the outermost surface of the diaphragm 50, at each of its opposite end portions, there is a fabric roving designated 54 which aids in securing the diaphragm in place.

It should be apparent that the diaphragm 50 comprises a flexible, substantially impermeable diaphragm of a tubular configuration which encases the articulation and is connected to the annuli 34 and 36 by virtue of its being connected at its end portions to the external surfaces of the sections 12 and 14 of the spacesuit 10.

In view of the elliptical configuration of the waist joint assembly 20, each of the links 38 is provided with a contour plate assembly, generally designated 56, FIGS. 4 and 5. This assembly includes a contour plate 57 extending along that portion of the elliptically configured joint having the shortest radius. As a practical matter, the contour plate assemblies 56 are mounted on the links 38 through the use of suitable screws 58.

Each of the contour plate assemblies 56 further includes a doubler plate 60 mounted on the contour plate 57 with a shim plate 62 interposed between the contour plate 57 and the link 38. It will, of course, be appreciated that the contour plate 57, doubler plate 60 and shim plate 62 are formed of a suitable material such as a rigid synthetic resin. The doubler plate 60 is of a width such as to extend substantially between the pivotal axes of the monoball joints 40 coupling the links 38 to the annuli 34 and 36 and is adhered to the midportion of the diaphragm 50 utilizing a suitable adhesive. Thus the diaphragm is supported against axial displacement relative to the waist joint.

As a practical matter, there is extended between the doubler plates 60 located at each of the opposite sides of the waist joint 20 a first transverse doubler plate section 64 and a second transverse doubler plate section 66 constituting a mirror image of the first transverse doubler plate section. These plates preferably are formed of a synthetic resin characterized by a suitable resiliency for accommodating flexing thereof. The doubler plate sections 64 and 66 also are adhered to the midportion of the diaphragm 50 but are provided with diminishing width dimensions approaching the section of the joint having the shortest diameter.

It is also important to note that in each of the opposite end portions of the tubular diaphragm 50 there is established a convolution having a crown 67 coincident with the axes of the adjacent monoball joints 40 and that due to the fact that the midportions of the diaphragm are adhered to the doubler plates 60, the position of the crowns relative to the axes remains fixed.

It should therefore be apparent that the contour plate assembly 56 imparts to the waist joint a substantially elliptical shape which conforms to the shape of the body of the wearer. Moreover, due to the fact that the doubler plate 60 and the transverse doubler plate sections 64 and 66 are adhered to the midportion of the tubular diaphragm 50, with the pair of pivotal axes coincident with the crowns of the diaphragm 50 a dual opposed rolling effect is achieved as pivotal motion is imparted to the annuli 34 and 36, as best illustrated in FIG. 4. Consequently, the waist joint assembly 20 comprises a constant volume mobility joint which maintains a substantially constant volume as it is deflected throughout the throw of its range so that movement of the wearer is readily accommodated.

Shoulder Joint Assembly

Turning now to FIG. 8, it can be seen that the shoulder joint assembly 22, like the waist joint assembly 20, comprises a constant volume mobility joint assembly.

As illustrated in FIGS. 1 and 2, the spacesuit 10 includes two shoulder joint assemblies which serve to connect the arm sections 16 to the torso section 12, as hereinbefore mentioned. However, since the shoulder joint assemblies 22 are of a common design, fabricated in a similar manner, and perform a similar function, a detailed description of a single one of the shoulder joint assemblies 22 is deemed adequate to provide a complete understanding of the invention.

The shoulder joint assembly 22, like the waist joint assembly 20, comprises a constant volume mobility joint assembly and serves to connect an arm section 16 to the torso section 12 in a manner such that rotation about orthogonally related axes is facilitated, as will hereinafter become more readily apparent.

With reference to FIG. 8, it should be noted that the shoulder joint assembly 22 includes a first subassembly, generally designated 68, and a second subassembly, generally designated 70, arranged in juxtaposition therewith. The first subassembly 68 includes a bearing assembly 71 within which there is included an inner base annulus 72 formed of a suitable material. The bearing assembly 71 is seated within an armhole, not designated, formed in the torso section 12. This assembly is supported by an annular bearing ring 74, mated with the periphery of the armhole. As a practical matter, the annular bearing assembly 71 is secured in place through any suitable means including suitable adhesives and the like while O-ring seals 78 and the like are provided for ensuring formation of hermetic seals.

Also included in the shoulder joint assembly 22, there is a pair of mutually spaced intermediate annuli, designated 80 and 82, and a terminal annulus 84. While the base annulus 72 is rotatably received within the annular bearing assembly 71, a bearing assembly, generally designated 86, is disposed in concentric relation with the annulus 84 and includes an inner ring 87. The purpose of the bearing assembly 86 is to rotatably couple the second subassembly 70 with the first subassembly 68, as will hereinafter be more fully described.

Attached to the shoulder joint assembly 22, in diametric opposition, there is a pair of restraining linkages, generally designated 88. This pair of linkages supports the joint assembly from distending longitudinally as pressure is developed within the suit 10. Since the restraining linkages 88 are of similar design, fabricated in a similar manner, and perform a similar function, a detailed description of one of the linkages is deemed adequate to provide a complete understanding of the invention.

Each of the restraining linkages 88 includes an anchor block 90 pinned or otherwise rigidly secured to a rib 92 integrally related with the base annulus 72. As a practical matter, screw threaded anchor pins 94 seated in coaxially aligned bores formed in the anchor block and the rib 92 serve to couple the block 90 with the rib 92.

Figure 9:
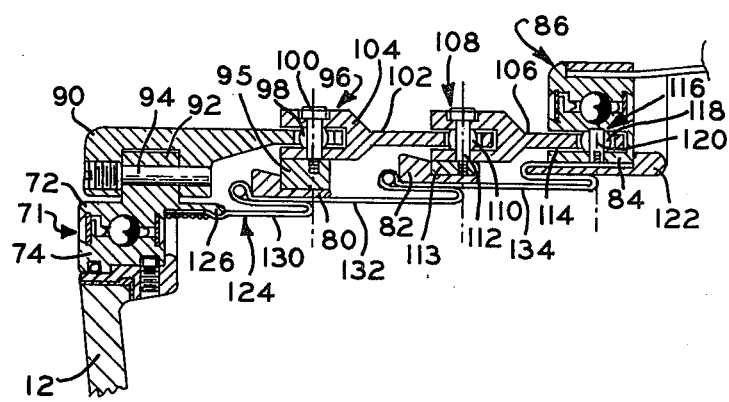
FIG. 9 is a horizontally sectioned view taken generally along lines 9—9 of FIG. 8.

As best illustrated in FIG. 9, the first intermediate annulus 80 is connected to the anchor block 90 through a standoff 95 mounted on the periphery of the annulus and a first monoball joint generally designated 96. The monoball joint 96, like the monoball joint 40, previously mentioned, includes a tubular ball, designated 98, seated in a projected portion of the anchor block 90. Through a bore formed in the ball 98 there is extended a pivot pin 100. As shown, the pin 100 includes a screw threaded end portion received in an internally threaded bore, not designated, formed in the stand-off mounted on the first intermediate annulus 80, whereby the annulus is supported for pivotal motion about an axis coincident with the longitudinal axis of the pivot pin.

In addition to connecting the first intermediate annulus 80 to the anchor block 90, the monoball joint 96 also serves to connect to the anchor block 90 an intermediate link, designated 102. Connection of the link 102 with the anchor block 90 is achieved through a bifurcated end bracket 104, formed as an integral part of the link 102 and having defined therein a pair of coaxially aligned bores through which extends the pivot pin 100. Thus the link 102, as well as the first intermediate annulus 80, is supported for pivotal displacement about an axis coincident with the longitudinal axis of the pivot pin 100.

To the link 102, at its distal end, there is connected a terminal link, designated 106. The link 106 is connected with the link 102 through a monoball joint 108 similar in design and function to the monoball joint 96. The monoball joint 108, as a practical matter, also includes a tubular ball 110 seated in an extended end portion of the link 102 through which there is extended a pivot pin 112. The pivot pin 112 is received in coaxially aligned bores formed in the opposite legs of a bifurcated end of the terminal link 106, in precisely the same manner in which the pivot pin 100 is extended through the tubular ball 98 of the monoball joint 96.

The pivot pin 112 also includes a screw threaded end portion received in an internally screw threaded bore formed in a stand-off 113 projected from the periphery of the second intermediate annulus 82 and serves to pivotally connect this annulus to the linkage 88. Thus the annulus 82 is supported for pivotal displacement about an axis coincident with the longitudinal axis of symmetry of the pivot pin 112.

Finally, the distal end portion of the link 106 is received within a slotted recess, designated 114, formed in the terminal annulus 84 and is connected thereto through a monoball joint 116. The monoball joint 116 is similar in design and function to the monoball joints 96 and 108, previously discussed. It should be apparent that the monoball joint 116 includes a tubular ball, designated 118, seated in the distal end of the link 106 through which is extended a pivot pin 120. The pivot pin 120 is, in turn, received in a blind bore, not designated, formed in the terminal annulus 84.

In view of the foregoing, it should readily be apparent that the annuli 72, 80, 82 and 84 are interconnected through the restraining linkage 88 and that the annuli 80, 82 and 84 are supported for pivotal displacement about axes arranged in mutual parallelism.

Extended between the base annulus 72 and the terminal annulus 84 there is a flexible diaphragm 124. As a practical matter, the diaphragm 124 is of a tubular configuration having a length substantially greater than the distance between the annuli 72 and 84. Moreover, the diaphragm 124 is formed of an impermeable material such as neoprene or the like laminated with a suitable fabric such as Nomex formed from synthetic resins.

It is noted that the diaphragm 124 is connected with the base annulus 72 at an annular lip 126. While suitable adhesives are employed in joining the diaphragm 124 with the lip 126 of the base annulus 72, a roving 128 is applied about the external surface of the diaphragm and is employed for this purpose in conjunction with the adhesive. As a practical matter, the opposite end of the tubular diaphragm 124 is secured to the terminal annulus 84 also by a suitable adhesive while a cap ring 122 extends in a banding fashion about the end portion of the diaphragm. Thus the diaphragm is secured in place relative to the terminal annulus 84. Similarly, the intermediate annuli 80 and 82 are secured to the internal surface of the diaphragm 124, at equi-distances, employing suitable adhesives and the like.

The diaphragm 124 is, for the sake of convenience, considered to be of a segmented construction and includes a first segment 130 extending between the base annulus 72 and the first intermediate annulus 80, a second segment 132 extends between the first intermediate annulus 80 and the second intermediate annulus 82, while a third segment 134 is extended between the second intermediate annulus 82 and the terminal annulus 84. It is important to note that the annuli 80, 82 and 84 are so positioned relative to the diaphragm 124 that each segment of the diaphragm includes a rolling convolution, the crown of which is coincident with the pivotal axis of the adjacent monoball joint, as best illustrated in FIG. 9. The relationship thus established between the pivotal axes of the monoball joints and the crowns of the segments of the diaphragm results in an exact balancing of pneumatic forces acting on the diaphragm. Of course, due to the fact that the annuli 80, 82 and 84 are fixed to the diaphragm, longitudinal displacement of the diaphragm 124 relative to the shoulder joint assembly 22 is obviated.

Moreover, for purposes of aiding in the support of the segments 130, 132 and 134 for securing the segments in a fixed relationship with the first and second intermediate annuli 80 and 82, a retention band 135, having a diameter substantially equal to the diameter of the intermediate annuli, is arranged in a banding relationship with each of the segments of the diaphragm 124 in juxtaposition with the first and second intermediate annuli.

The second subassembly 70 includes an impervious shell 136 formed of a laminate similar to the material from which the diaphragm 124 is fabricated. The shell 136 is of a sleeve-like configuration and includes end openings 138 and 140 disposed in intersecting planes through which an arm of a wearer of the suit extends when the suit is in use. The particular material from which the shell 136 is formed may be varied as desired, however, in practice the material from which the diaphragm 124 is formed serves quite satisfactorily for this purpose.

It is important to note that the end portion of the shell 136 is received by the annular bearing assembly 86 in an annular recess 141 formed in the inner ring 87 of the bearing assembly 86. A retainer ring 142 is, in turn, received in a concentric relationship with the end portion of the shell 136 and seats in an abutted relationship with an annular lip 144 projected radially from the inner ring 87 of the bearing assembly 86. As a practical matter, a suitable adhesive is employed in joining the retainer ring 142, the shell 136 and the inner ring 87 of the bearing assembly 86. It should, at this juncture, be apparent that the shell 136 is supported by the bearing assembly 86 for rotary motion about the axis of symmetry for the terminal annulus 84.

The opposite end of the shell 136 is received by an annular lip 144 projected axially from an outer bearing ring, designated 147, of a bearing assembly 148. It is noted that the retainer ring 146 includes a lip defining a recessed portion 149 which serves to receive an end portion of the shell 136. A fabric roving 150 is formed about the external surface of the end portion of the shell 136 and is capped by a capping ring 152, also of a fabric material. Again, it is to be understood that a suitable adhesive is employed in uniting the shell 136 with the retainer ring 146.

The bearing assembly 148 also includes an inner ring 154 which is received by uniting with the segment 16a of the arm section 16. Therefore, it should be apparent that the bearing assembly 148 serves to support the arm section 16 of the spacesuit for rotary motion about the axis of symmetry for the retainer ring 146.

In view of the foregoing, it is believed to be apparent that the elbow joint comprises a constant volume joint supported by the internal pressure of the suit, which accommodates pivotal motion about a multiplicity of angularly related axes with full range of motion which characterizes the shoulder joint of the human body.

Elbow Joint

As illustrated in FIGS. 1 and 2, each arm section 16 includes an elbow joint 24 interposed between the segments 16a and 16b. Since the elbow joints 24 are of similar design and construction and function in a similar manner, a detailed description of a single one of these joints is deemed sufficient to provide for a complete understanding of the instant invention.

Figures 10, 11:
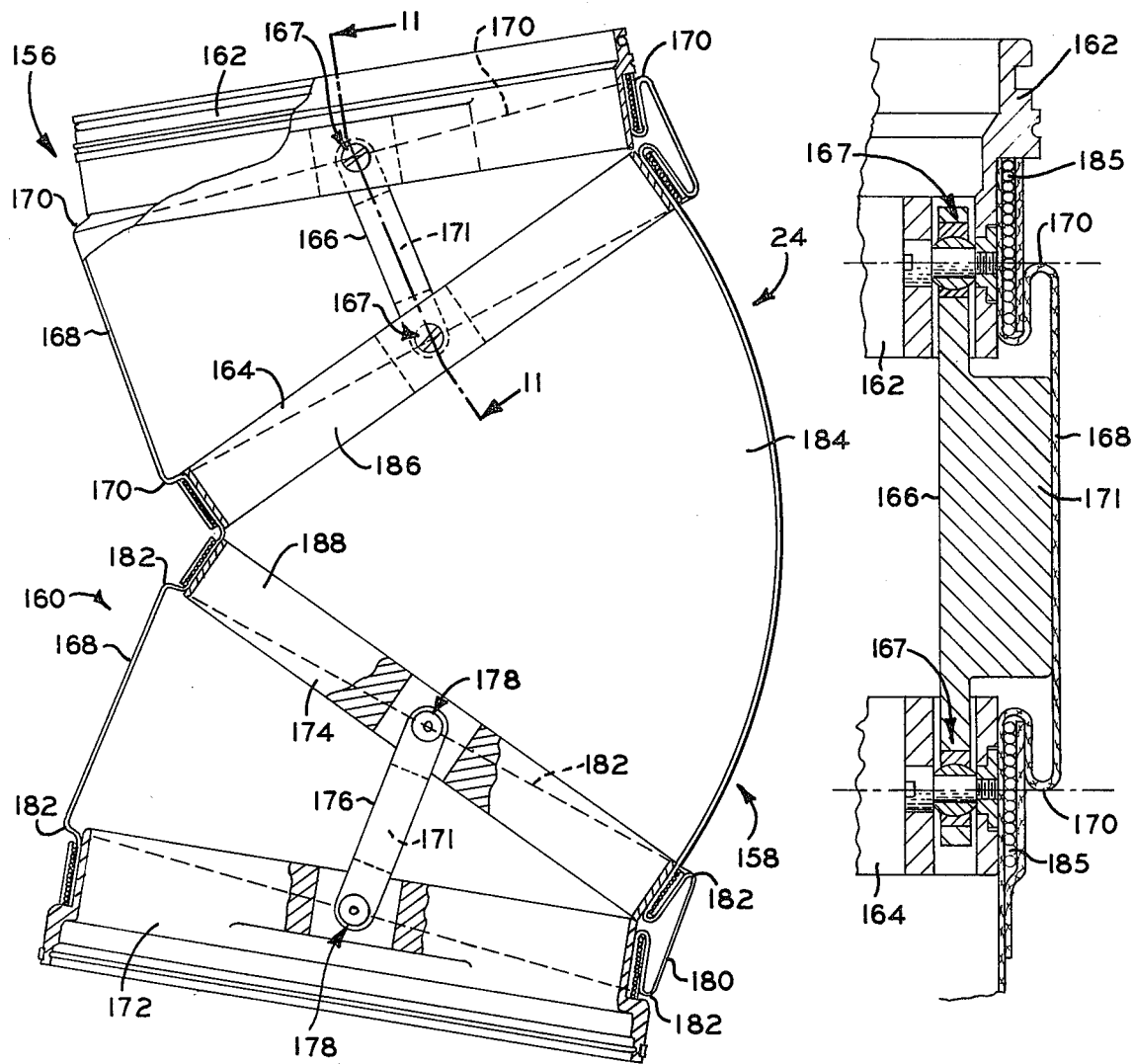
FIG. 10 is a fragmented, partially sectioned side elevational view of an elbow joint shown in FIGS. 1 and 2.
FIG. 11 is a sectional view taken generally along lines 11—11 of FIG. 10.

Referring now with more particularity to FIGS. 10 and 11, it can be seen that each elbow joint assembly 24 includes a first subassembly 156, a second subassembly 158 and a third subassembly 160, which serve to accommodate a full range of motion which characterize the motions of an elbow joint of a human arm.

The first subassembly 156 includes a first rigid annulus 162 connected to the lowermost end of the segment 16a of the arm section 16 of the suit 10. Disposed in axially spaced relation with the annulus 162, there is a second rigid annulus 164. The annuli 162 and 164 are interconnected by a pair of rigid links 166 extended therebetween. The links 166 are pivotally connected at monoball joints 167 to the annuli for thus establishing a pivotal axis for each annulus substantially coincident with the diameter thereof.

The monoball joints 167 are, of course, similar in design and construction to the monoball joints, previously discussed, typified by the monoball joints 96 and 108. Therefore, a detailed description of the monoball joints 167 is omitted. It suffices to understand that each of these joints includes a tubular ball, not designated, seated in an end portion of a rigid link through which there is extended a pin having its opposite ends supported in coaxially aligned bores formed in a suitable bracket mounted on an annulus. The pin is secured by a head located at one end thereof and a nut located at the other, all in a manner well understood by those familiar with such joints.

Between the annuli 162 and 164 there is extended a diaphragm 168. This diaphragm is characterized by convolutions having crowns 170 established in the opposite ends thereof. It is important to note that the crowns 170 are coincident with the pivotal axes established by the monoball joints 167. Further, it is to be noted that the axial position of the diaphragm is maintained through stand-offs, designated 171, projected from each of the links 166 into engaging relation with the diaphragm 168 and connected to the midportion thereof, FIG. 11.

For the sake of convenience, a description of the second subassembly 158 is provided in following relation to the description of the third subassembly 160.

The third subassembly 160 is similar in design and construction to the first subassembly 156. Therefore, it should be understood that the third subassembly 160 includes a first annulus 172, also of a rigid configuration, connected to the segment 16b of the arm section 16. Disposed in spaced relation with the first annulus 172 is a second rigid annulus 174. Between the annuli 172 and 174 there is extended a pair of rigid links 176 which serve to support the first and second annuli for pivotal displacement about a pair of axes coincident with the diameters of the annuli. As a practical matter, the rigid links 176 are connected with the annuli 172 and 174 by monoball joints 178, similar in design and construction to the monoball joints 167, hereinbefore mentioned. It will, therefore, be appreciated that the first and second annuli 172 and 174 are supported for pivotal displacement about a pair of mutually spaced axes coincident with the monoball joints 178, in precisely the same manner in which the annuli 162 and 164 are supported for pivotal displacement.

Additionally, there is provided a diaphragm 180 extending between and affixed to the first and second annuli 172 and 174 having defined in each of its opposite ends a crown 182 coincident with the axes of the monoball joints 178. Like the diaphragm 168, the midportion of the diaphragm 180 is supported in fixed axial relation with the annuli to which it is affixed by a stand-off, not shown, projected from each of the links 176 into abutting engagement with the diaphragm. Thus the diaphragm 180 is supported against axial displacement in precisely the same manner in which the diaphragm 168 is supported by the links 166. Thus the crowns 182 are supported in coincident relation with the axes of the monoball joints 178.

The second subassembly 158 of the elbow joint assembly 24 also is of a tubular configuration and comprises a sleeve-like shell 184 having a first end opening 186 and a second opening 188. These openings are disposed in intersecting planes and serve to receive an arm of the wearer.

The first end opening 186 is concentrically related to the second annulus 164 of the first subassembly 156, while the second end opening 188 is concentrically related to the second annulus 174 of the third subassembly 160. The shell 184, as a practical matter, is formed of a material similar to the material from which the diaphragms 168 and 180 are formed. Consequently, where so desired, the diaphragms, designated 168 and 180, and the shell 184 comprise a singular member of unitary construction. This member, not designated, is united with the annuli 162, 164, 172 and 174 through a use of adhesives and roving 185 in substantially the same manner as that in which the shell 136 of the shoulder joint assembly 22 is connected with the lip 144 of the ring 146. Therefore, a detailed description of the manner in which the diaphragms 168 and 180, as well as the shell 184, are affixed to the annuli of the elbow joint assembly 24 is omitted.

It should, in view of the foregoing, be apparent that the elbow joint assembly comprises a constant volume joint supported by the internal pressures of the suit, while the links 166 and 176 support the joint against axial distension and that the joints are pneumatically balanced due to the effects of the rolling convolutions of the diaphragms as pivotal motion of the segments 16a and 16b of the arm section 16 occurs about an axis transversely related to the elbow joint assembly.

Hip Joint

Figure 12:
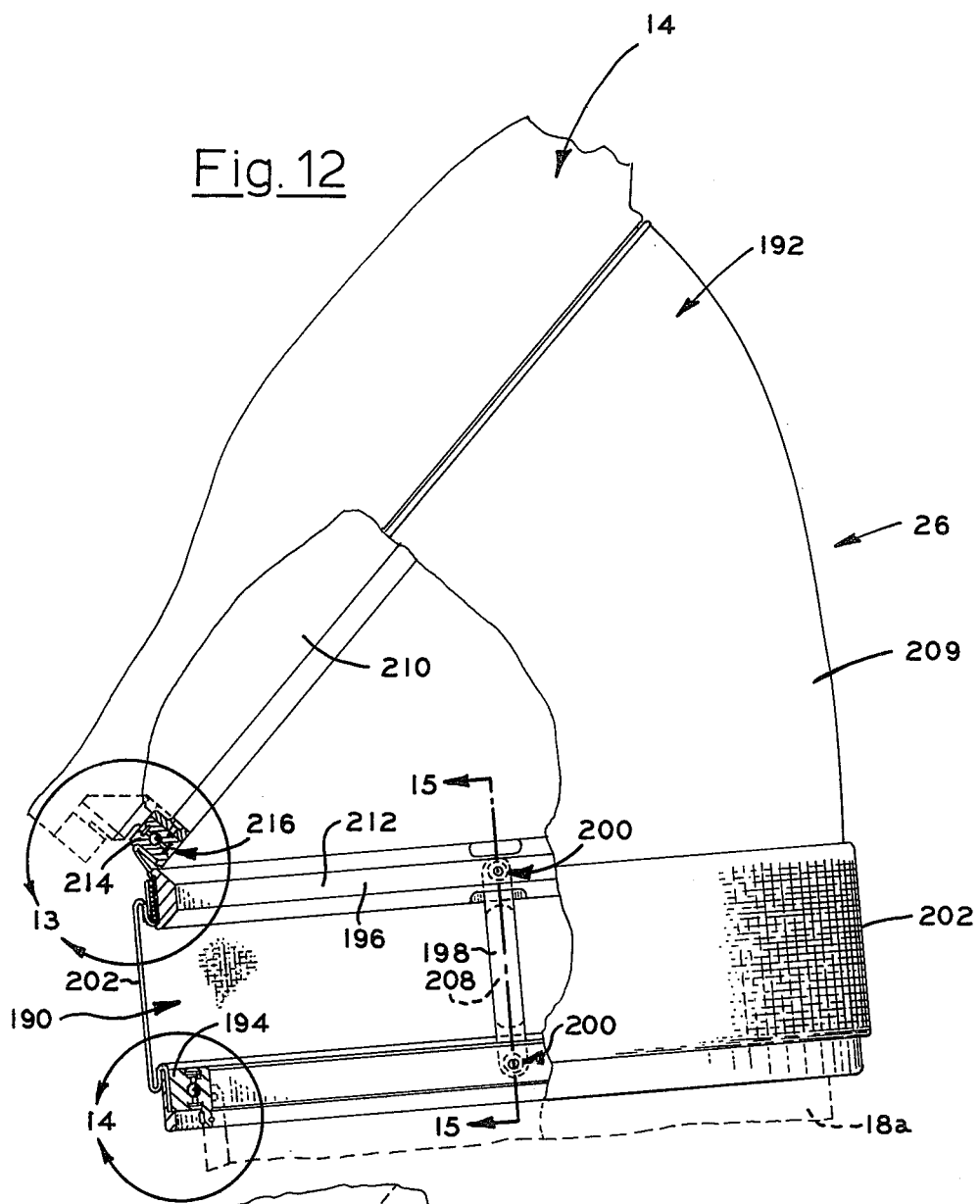
FIG. 12 is a fragmented, partially sectioned side elevation of the hip joint shown in FIGS. 1 and 2.

Attention is now invited to FIG. 12 wherein there is illustrated, on an enlarged scale, one of the hip joint assemblies 26 illustrated in FIGS. 1 and 2 and employed in connecting the leg section 18 with the brief section 14 of the suit 10. It is important to appreciate that the hip joint assemblies 26 are of a common design and function in a common manner to achieve similar results. Therefore, a description of a single one of the hip joint assemblies 26 is deemed adequate to provide for a complete understanding of the instant invention.

The hip joint assembly 26, as illustrated in FIG. 12, is similar in many respects to the elbow joint 24 previously described. However, the hip joint assembly 26 includes a first subassembly, generally designated 190, connected to the segment 18a of the leg section 18, and a second subassembly, generally designated 192, connected to the brief section 14.

Figure 15:
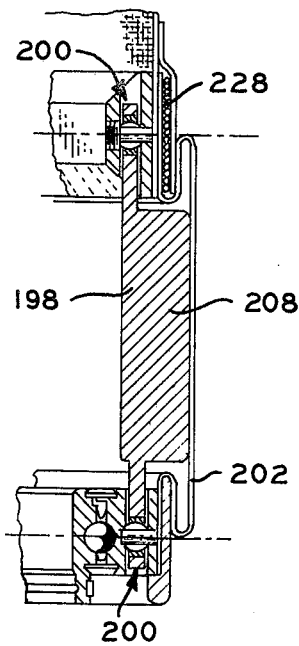
FIG. 15 is an enlarged view taken along lines 15—15 of FIG. 12.

The first subassembly 190 includes a first annulus 194 and a second annulus 196 disposed in spaced relation with the first annulus. It is noted that the annuli 194 and 196 also are of rigid construction and are supported for pivotal displacement about a pair of pivotal axes arranged in mutual parallelism and coincident with the diameters of the annuli. A pair of rigid links is provided at opposite sides of and connected to the annuli 194 and 196. The rigid links 198 are similar in design and function to the rigid links 176 of the elbow joint assembly 24, previously described, and are pivotally connected with the annuli 194 and 196 through pairs of monoball joints designated 200. As illustrated in FIG. 15, the monoball joints 200 are similar in design and construction to the monoball joints previously described and typified by the monoball joints 116, illustrated in FIG. 9. Therefore, a detailed description of the monoball joints 200 is omitted in the interest of brevity. However, it is to be understood that the rigid links 198 serve to restrain the hip joints against distension while accommodating pivotal motion of the leg section 18, relative to the brief section 14 of the suit 10.

The hip joint assembly 26 also includes a diaphragm 202 of a tubular configuration which extends between the annuli 194 and 196. The diaphragm 202, like the diaphragm 168, is formed of a flexible, impervious material and includes a rolling convolution formed at each of its opposite ends. The rolling convolution at the lowermost end of the diaphragm, adjacent to the segment 18a, includes a crown 204 coincident with the pivotal axis of the annulus 194 and a crown 206 disposed in opposed relation with the crown 204 and coincident with the pivotal axis of the annulus 196. Consequently, as pivotal motion is imparted to the annuli 194 and 196, opposed rolling motion is imparted to the convolutions located at the opposite ends of the diaphragm segment 202.

It is important to note that a stand-off 208, as best illustrated in FIG. 15, is provided for connecting the midportion of the diaphragm segment 202 to the links 198, in much the same manner as the diaphragm 168 is attached to the stand-offs 171 projected from the links 166 of the elbow joint assemblies 24. Therefore, it should be appreciated that the diaphragm segment 202 is supported against longitudinal displacement, relative to the joint assembly, by the stand-offs 208 projected from the links 198 and attached to the diaphragm.

The second subassembly 192 includes a shell 209 comprising a tubular sleeve-like configuration having end openings 210 and 212 disposed in intersecting planes. The shell 209, like the diaphragm segment 202, is formed of a flexible, impervious material. Consequently, like the shell 184 and diaphragms 168 and 180 of the elbow joint assembly 24, where so desired, the diaphragm segment 202 and the shell 209 comprise a singular member, not designated, of singular unitary construction.

As should be apparent from a review of FIG. 12, the shell 209 extends between the annulus 196 and the brief section 14 of the spacesuit. In order to connect the shell 209 with the torso of the spacesuit, there is provided an annulus 214, FIG. 13, which, like the annulus 72 of the shoulder joint assembly 22, comprises the outer ring of an annular bearing assembly, generally designated 216. The inner ring of the bearing 216, designated 218, is affixed to the brief section 14 of the spacesuit 10 in coaxial alignment with a leg opening, not designated, formed therein for accommodating insertion of a wearer's leg.

In order to attach the shell 209 to the annulus 214, the annulus is provided with a recess 220, also of an annular configuration, which receives therein one annular end portion of the shell. A suitable adhesive, not designated, is disposed between the adjacent surfaces of the shell 209 and the annulus 214 for forming a union therebetween, while a cap ring 222 is provided in binding relation with the external surface of the shell for supporting the shell in place in the recess 220.

The end of the shell 209 opposite the recess 220 comprises a zone designated 224 received in an annular recess 226 formed in the peripheral surface of the annulus 196. The zone 224 of the shell and diaphragm is secured in place through a use of an adhesive, not designated, and roving 228, in a manner similar to that in which adhesives and roving are employed in connecting the shell 184 and diaphragms 168 and 180 to the annuli of the elbow joint assembly 24.

Finally, the opposite end of the diaphragm segment 202 is received by the peripheral surface of the annulus 194 and is secured in place through a use of a suitable adhesive, or the like, and a cap ring 230 disposed in a banding relation therewith.

Like the annulus 214, the annulus 194 comprises an outer ring of a bearing assembly, generally designated 232. The inner ring of the bearing assembly 232, designated 234, serves to connect the hip joint assembly 26 with the upper leg segment 18a. It will be appreciated that suitable O-rings and the like, not designated, are employed in effecting an hermetic seal between the inner ring 234 and the segment 18a of the leg section 18.

In view of the foregoing, it should be apparent that each of the hip joint assemblies 26 is supported for rotation about the axis of a leg opening formed in the brief 14 of the spacesuit 10, and that the hip joint assemblies 26 support the segmented leg section 18 for rotation about an axis angularly related to the axis of the leg opening. Moreover, due to the pivotal support afforded by the monoball joints 200, each of the annuli 194 and 196 are supported for pivotal displacement about pivotal axes extended in parallelism with the diameters thereof. Moreover, the diaphragm segment 202 is supported against longitudinal displacement by the stand-offs 208 projected from the rigid links 198 so that the crowns 204 and 206 remain in a fixed relationship with the pivotal axes of the monoball joints 200. Thus, a rolling convolution is established at each of the opposite ends of the diaphragm segment 202 as pivotal motion is imparted to the annuli 194 and 196 so that a balanced, constant volume joint is established in the suit for the hip joint of a wearer.

Knee Joint Assembly

As illustrated in FIGS. 1 and 2, the knee joint assemblies 28 serve to interconnect the upper segments 18a of the leg sections 18 with the lower segments 18b of the leg sections. Since these assemblies are of a common design and function in a similar manner, a detailed description of a single one of the joint assemblies is deemed adequate for purposes of providing for a complete understanding of the invention.

It is noted that each knee joint assembly 28 is similar to the elbow joint subassemblies 24 in that the knee joint assembly includes first, second and third subassemblies, designated 236, 238 and 240, respectively, which cooperate to accommodate required mobility for the assembly.

Moreover, it is important that it be appreciated that the subassemblies 236 and 238 are similar in many respects to the mobility joints disclosed in United States Letters Pat. No. 3,832,735, which issued to William Elkins, Sept. 3, 1974, assigned to the United States National Aeronautics & Space Administration, while the third subassembly 240 is similar in many respects to the second subassembly 158 of the elbow joint assembly 24.

Figures 16, 17:
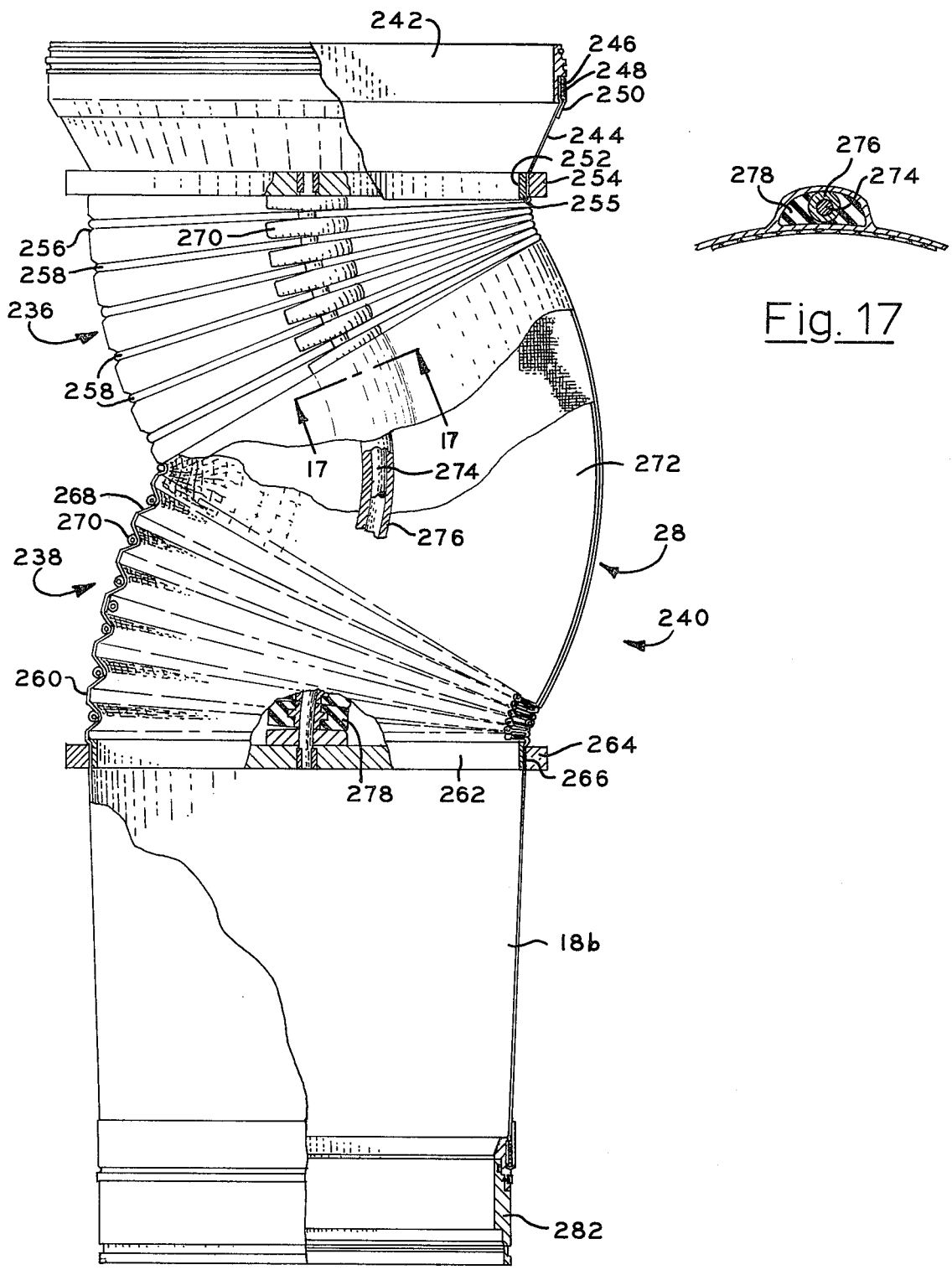
FIG. 16 is a partially sectioned side elevational view of a knee joint shown in FIGS. 1 and 2.
FIG. 17 is a cross sectional view taken generally along lines 17—17 of FIG. 16.
Figure 18:
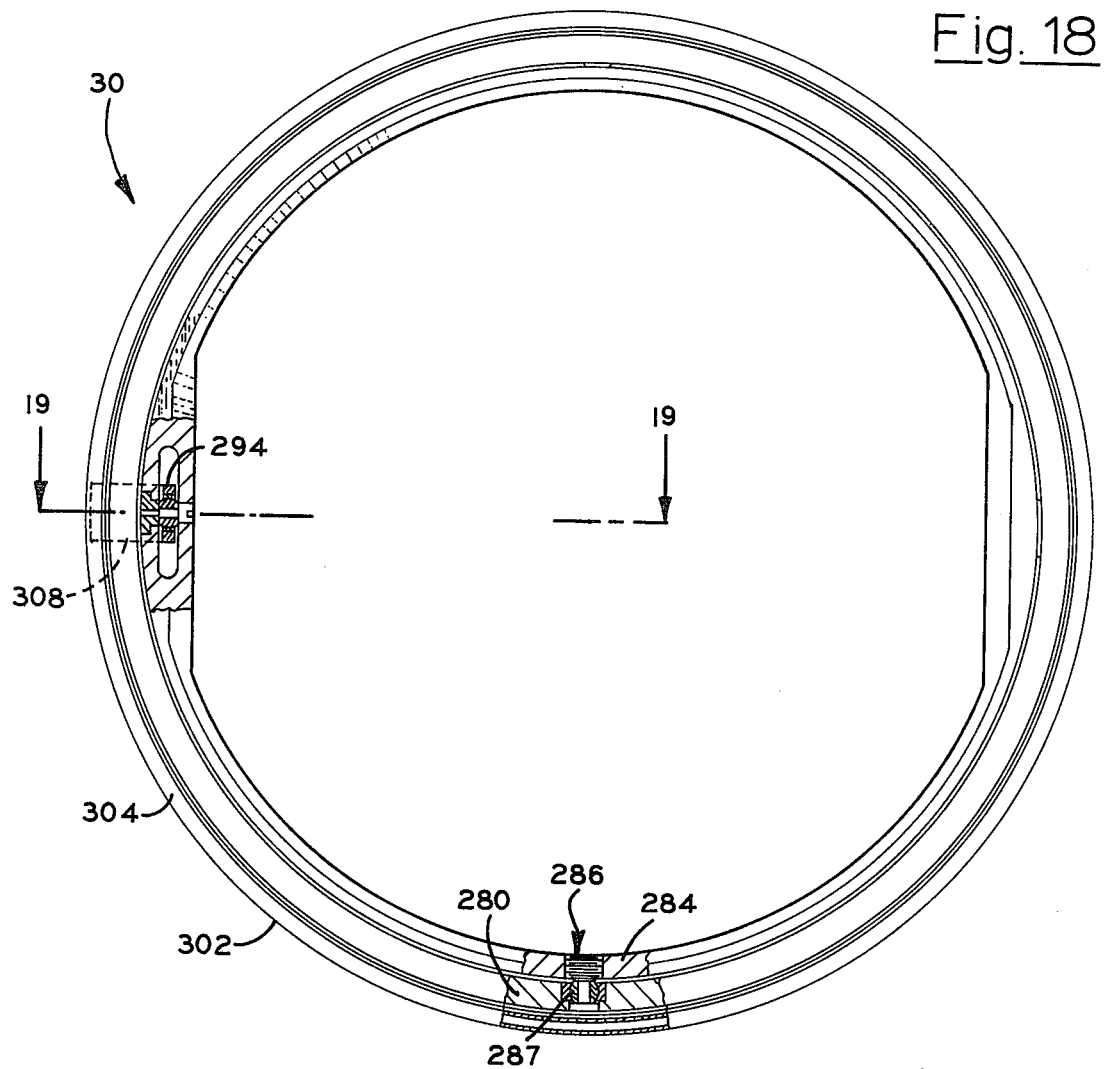
FIG. 18 is a bottom plan view of an ankle joint shown in FIGS. 1 and 2.

In practice, the knee joint assembly includes a first rigid annulus 242 connected to a segment 18a of a leg section 18, in a suitable manner employing O-ring seals and the like, not designated. To the annulus 242 there is attached one end of a tubular diaphragm 244. The end of the diaphragm 244 is received in an annular recess 246 formed about the peripheral surface of the first annulus 242 and connected thereto in a manner hereinbefore discussed. It should, therefore, be apparent that roving 248 is applied about the periphery of the diaphragm for securing the diaphragm in place relative to the annulus while suitable adhesive also is employed in joining the diaphragm to the annulus, as illustrated in FIG. 16. A suitable cap ring 250 is provided in circumscribing relation with the roving.

Disposed in spaced relation with the first annulus 242, there is a second rigid annulus 252 of a slightly reduced diameter. The second annulus 252 is positioned internally of the diaphragm 244 and engages the periphery thereof while a clamping ring 254 is provided in banding relation with the diaphragm 244, in concentric relation with the annulus 252. The annulus 252 includes an annular lip 255 within which the ring 254 seats with the diaphragm being supported in a sandwiched relation between the annulus 252 and the ring 254. Of course, a suitable adhesive preferably is employed in joining the diaphragm 244 to the second annulus 252.

About the diaphragm 244 there is formed in axially spaced relation a multiplicity of annular accordion pleats 256. Each of these pleats is supported by a ring 258 which serves to maintain the pleated configuration of the diaphragm 244 as the knee joint assembly 28 is caused to undergo flexion.

The second subassembly 238 is similar to the first subassembly 236 and includes a pleated diaphragm 260.

In order to attach the diaphragm 260 to the segment 18b of the leg section 18, a third rigid annulus 262 is provided internally of the diaphragm 260 while about the annulus 262 there is provided a retainer ring 264 seated in a recess 266 established by an annular lip projected from the periphery of the annulus 262. It is to be understood that the diaphragm segment 260 also is of a flexible, impermeable material and includes a plurality of pleats 268 supported by retainer rings 270. Thus the second subassembly 238 is afforded flexion as the consequence of a changing of dimensions of the pleats 268.

Interposed between the first and second subassemblies 236 and 238 is disposed the aforementioned third subassembly 240. The subassembly comprises a tubular shell 272 similar in design and function to the second subassembly 158 of the elbow joint and the shell 209 of the hip joint. It is important to appreciate, of course, that the shell 272 also is formed of a flexible, impervious material similar to the material from which the diaphragm segments 244 and 260 are formed.

In order to prevent the knee joint from being distended as a consequence of internal pressurization of the suit 10, there is provided a ligament 274 extended along each of the opposite sides of the knee joint assembly adapted to support the joint in tension. A suitable sleeve 276 serves as a sheath for the ligament 274 and is received by suitably configured stand-offs 278 connected to the external surfaces of the knee joint assembly.

As a practical matter, the leg segment 18b also is formed of a flexible, impervious material, therefore, the diaphragm segments 244 and 260, as well as the shell 272 and the segment 18b of the leg section 18 preferably are formed of a common flexible, impervious material such as a lamination of neoprene or Nomex. Consequently, these components preferably are of a singular construction and provided as a unitary member, not designated, during the assembly of the suit. However, where so desired, the segments and the shell may be separately fabricated and united in the knee joint assembly.

It is important to note that the diaphragm segments are collapsed at one side thereof while the diametric opposite side is expanded, and that during flexion, a reversed configuration is imparted to the knee joint assembly. Thus the knee joint assembly comprises a balanced, constant volume joint assembly which accommodates motion of the knee joint of the wearer.

Ankle Joint

Figure 21:
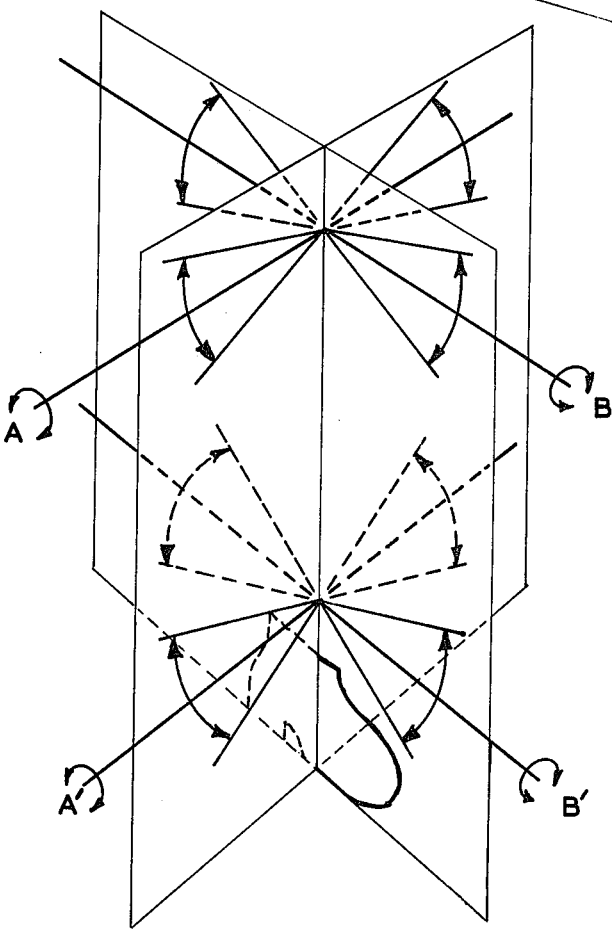
FIG. 21 is a diagrammatic view depicting motion for the ankle joint of FIGS. 18-20.

Returning again to FIGS. 1 and 2, it is again noted that each of the ankle joint assemblies 30 serves to connect a boot section 32 to a leg section 18. Moreover, each ankle joint assembly 30 supports the boot for rotation about a pair of coplanar, orthogonally related axes whereby adduction and deduction flexion in orthogonally related planes is facilitated, as depicted in FIG. 21. Since the ankle joint assemblies 30 are of a common design and function in substantially the same manner, a description of a single one of the ankle joints 30 is deemed adequate for providing a complete understanding of the instant invention.

Figure 19:
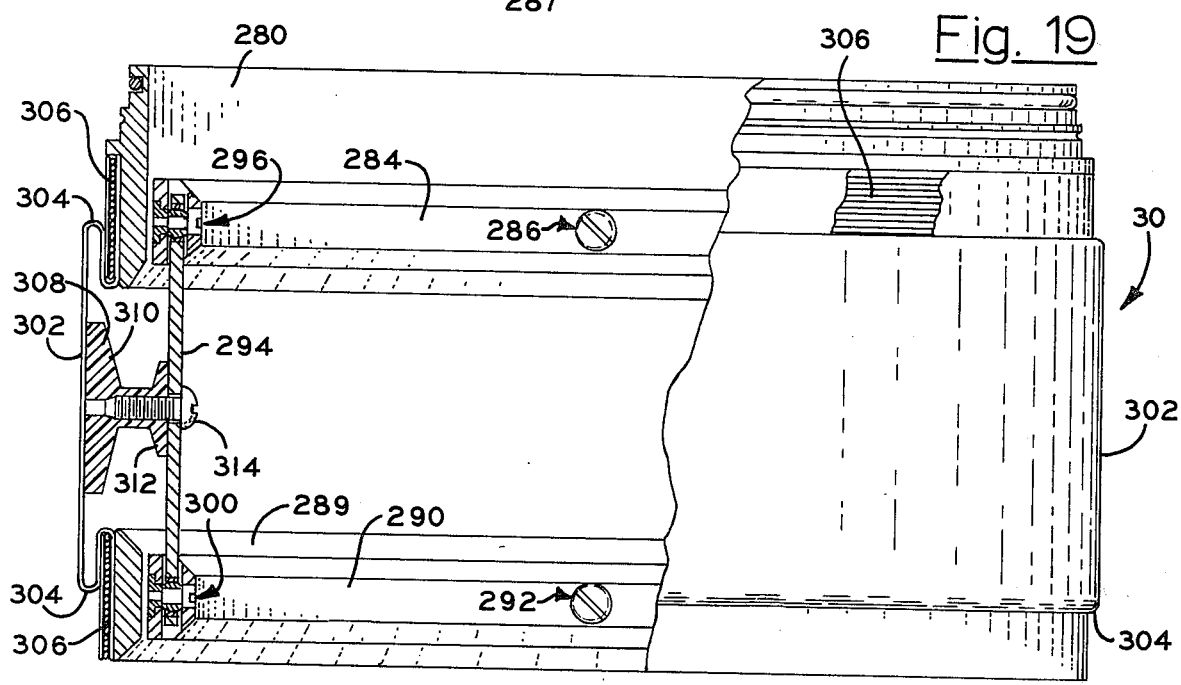
FIG. 19 is a partially sectioned side elevation of the ankle joint, taken generally along lines 19—19 of FIG. 18.
Figure 20:
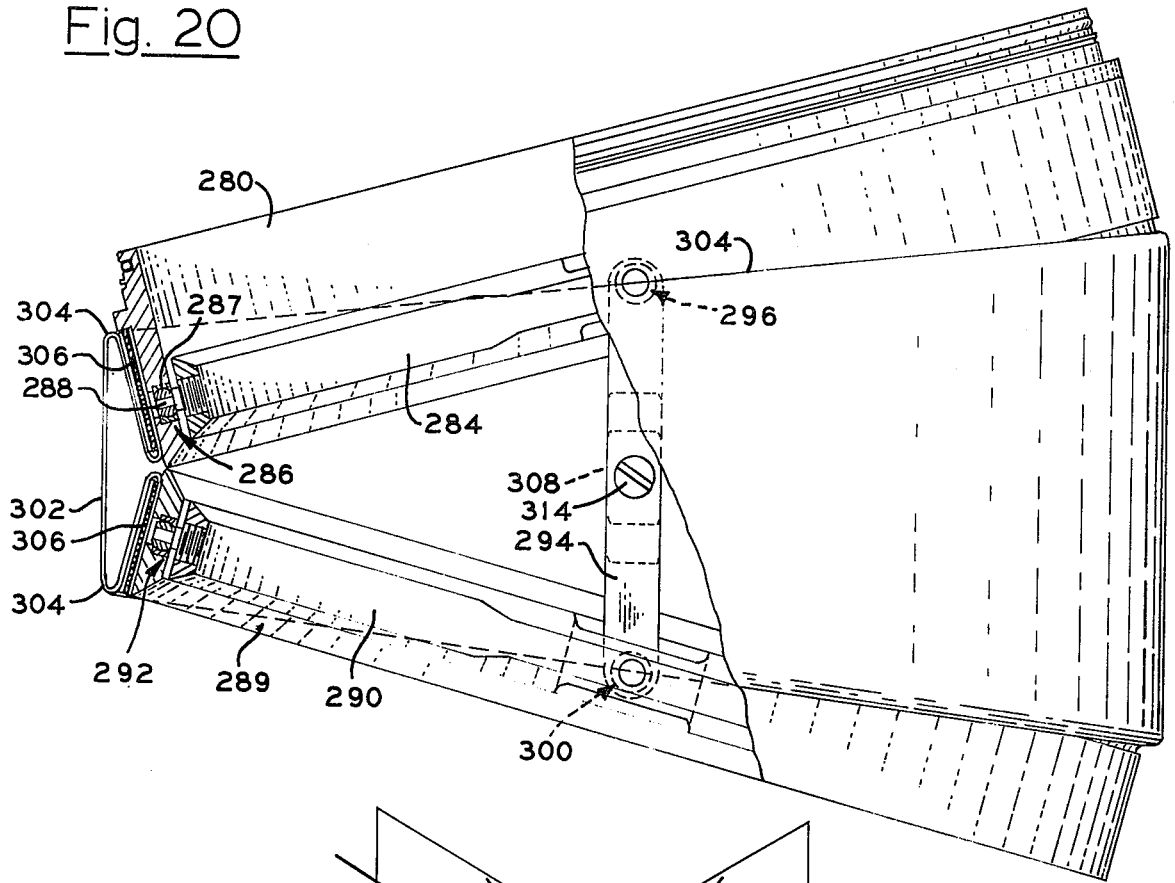
FIG. 20 is a partially sectioned view, taken at 90° with respect to FIG. 17.

Turning now to FIGS. 18 through 21, the ankle joint 30 is provided with a first rigid annulus 280, FIG. 19. This annulus is connected by a suitable coupling, not shown, with a receiver, also not shown, provided at the lowermost end portion of the segment 18b of the leg section 18, FIG. 16.

Disposed in concentric relation with the first annulus 280, there is a second rigid annulus 284 pivotally connected with the first annulus 280 at a first pair of axially aligned monoball joints, generally designated 286. The monoball joints 286 are similar to the monoball joints hereinbefore described, typified by the monoball joints 167, FIG. 11. It is sufficient to understand that each of the monoball joints 286 includes a tubular ball 287 seated in the annulus 280, at the opposite sides thereof while a pair of pivot pins 288 is projected from the annulus 284 and extended through the balls 287. The axes of the joints thus formed define a pivotal axis for the second annulus 284 which is coincident with a diameter thereof. A third rigid annulus 289 is disposed in axially spaced relation with the first annulus 280, while a fourth rigid annulus 290 is concentrically related to the third annulus. The third annulus 289 is pivotally connected to the fourth by a second pair of monoball joints, designated 292, similar in design and construction to the joints 286, and defining an axis paralleling the axis of the pair of monoball joints 286. Thus the annulus 289 is supported for pivotal displacement about an axis coincident with a diameter thereof.

Extended in parallelism between the second annulus 284 and the third annulus 289 there is a pair of rigid links, only one of which is shown, designated 294. The rigid links 294 are connected to the second annulus 284 at a pair of monoball joints 296 angularly displaced 90° from the first pair of monoball joints 286 while the links are connected to the annulus 290 at a pair of monoball joints 300 in coplanar relation with the joints 286. These joints define pivotal axes for the links which extend orthogonally with respect to the pivotal axes defined by the monoball joints 286 and 292. The monoball joints 296 and 300 are similar in design and function to the monoball joints 167, previously discussed. The rigid links 294 thus pivotally connect the first and second annuli with the third and fourth annuli and serve to preclude distension of the joint as pressure is introduced into the suit.

Extending between the first and fourth annuli is a segment of a flexible diaphragm designated 302. The diaphragm 302 is similar in design and function to the diaphragm segments hereinbefore mentioned and typified by the segment 202, FIG. 15.

It is to be understood that the diaphragm segment 302 includes a convolution having a crown 304 at each of its opposite ends coincident with the axes defined by the monoball joints 286, 292, 296 and 300.

Figure 13:
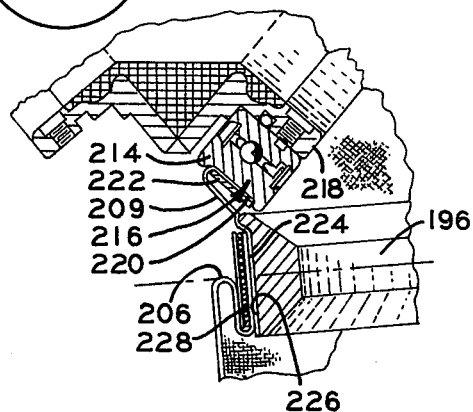
FIG. 13 is an enlarged, fragmentary view taken at the structure circumscribed by line 13 in FIG. 12.
Figure 14:
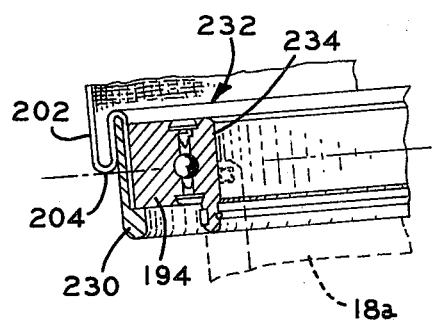
FIG. 14 is an enlarged, fragmentary view of the structure circumscribed by line 14 in FIG. 12.

The diaphragm segment 302 is joined to the first and third annuli employing suitable adhesives, as well as roving 306, similar to the adhesives and roving hereinbefore described, typified by the roving 228 shown n FIG. 13. A suitable cover strip, not designated, similar to the aforementioned ring 152, is provided in banding relation with the roving 206. It should be understood, therefore, that the opposite ends of the diaphragm segment 302 are secured to the first and fourth annuli for thus forming an hermetically sealed joint.

Additionally, each of the rigid links 294, only one of which is shown in FIG. 19, includes a radially extended stand-off 308 connected with the midportion of the diaphragm segment 302 for supporting the segment against longitudinal displacement relative to the joint, in much the same manner as the stand-off 208, FIG. 15, is employed for restraining the diaphragm segment 202, against axial displacement relative to the hip joint assembly 26. As shown, the stand-off includes a spool-like body including a first base plate 310 to which is connected the diaphragm segment 302, and a second base plate 312 arranged in juxtaposition with the link 294. Each of the stand-offs 308 is connected with one of the rigid links 294 through the use of suitable fasteners such as screws 314.

In view of the foregoing, it should be apparent that the first, second, third and fourth annuli are interconnected to thus establish a gimbal system affording multiple axis articulation and sealed by a diaphragm having rolling convolutions provided at each of the opposite ends thereof.

Finally, it is to be understood that the boot 32 is connected to the annulus 289 in a manner similar to that in which the diaphragm segment 302 is connected thereto. Since the boot forms no specific part of the instant invention, a detailed description thereof is omitted in the interest of brevity. However, it should be apparent that the boot 32 is afforded pivotal motion about orthogonally related axes, designated A, A¹, and B and B¹, FIG. 21, which in effect accommodates omnidirectional rotation of the ankle joint for thus affording the boot required mobility.

In view of the foregoing, it is believed that the joints hereinbefore described comprise substantially constant volume joints supported against longitudinal distension and are characterized by low torque and low leakage characteristics.

Although the invention has been herein shown and described in what is conceived to be the most practical and preferred embodiments, it is recognized that departures may be made therefrom within the scope of the invention, which is not to be limited to the illustrative details disclosed.

What is claimed is:

1. In a constant volume mobility joint assembly particularly suited for interconnecting adjacent segments of an hermetically sealed pressure suit for relative motion, an annulated joint comprising:
    A. a pair of axially spaced, rigidly configured annuli including a first annulus supported for pivotal displacement about a first axis paralleling the diameter thereof and a second annulus arranged in axially spaced relation with said first pivotal axis and supported for pivotal displacement about a second pivotal axis arranged in spaced parallelism with said first axis;
    B. restraint means extended between the annuli and connected thereto for maintaining the pivotal axes in a substantially fixed spatial relationship;
    C. a flexible, substantially impermeable diaphragm of a tubular configuration spanning the distance between the annuli and connected thereto in an hermetically sealed relationship therewith characterized by a length dimension greater than the distance between the pivotal axes and having defined therein at least one rolling convolution having a crown disposed in a fixed relationship with at least one annulus; and
    D. means connected with said diaphragm for maintaining a coincident relation between said crown and the pivotal axis of said one annulus as pivotal displacement is imparted to the annuli of said pair.

2. The joint of claim 1 wherein said rolling convolution comprises one of a plurality of rolling convolutions.

3. The joint of claim 2 further comprising an annular band adjacent the interior surface of the midportion of said diaphragm for supporting said diaphragm from axial displacement relative to said one annulus.

4. The joint of claim 1 wherein said joint assembly further comprises:
    A. means including a tubular body characterized by a pair of abaxially aligned openings disposed in intersecting planes; and
    B. means for connecting one annulus of said pair of annuli to said body in coaxial alignment with one of said openings and supporting said tubular body for rotary displacement about the axis of symmetry for said one annulus.

5. The joint of claim 1 wherein said restraint means includes a pair of ties extended between the first and second annuli in substantial mutual parallelism.

6. The joint of claim 5 wherein said ties are connected with the first and second annuli at diametrically related points.

7. The joint of claim 6 wherein each tie of said pair comprises an articulated linkage.

8. The joint of claim 6 wherein each tie of said pair comprises a rigid link pivotally connected at its opposite ends to the annuli of said pair for supporting the annuli for independent pivotal displacement about an axis coincident with the crown of the diaphragm.

9. The joint of claim 8 wherein said restraint means further includes a stand-off projected from each link and connected to said diaphragm near the midportion thereof restraining said midsection from axial displacement relative to said joint.

10. The joint of claim 9 further comprising a coupling including a monoball for pivotally connecting at least one end of each link to one annulus of said pair of annuli.

11. The joint of claim 1 further comprising bearing means for interconnecting adjacent segments of said suit for relative rotary displacement including first bearing means connecting said first annulus to one segment of said suit and second bearing means connecting the second annulus to another segment of the suit.

12. The joint of claim 1 wherein each annulus of said pair of annuli is of a substantially ellipsoidal configuration.

13. In an hermetically sealed pressure suit characterized by a brief section and a torso section, a constant volume waist joint assembly comprising:
    A. a pair of annuli including a first annulus of an elliptical configuration affixed to the torso section of the suit, a second annulus of an elliptical configuration affixed to the brief section of the suit;
    B. means supporting the annuli for pivotal displacement about a pair of mutually spaced, coplanar axes extended in parallelism with the greatest diameters of the annuli;
    C. an impermeable diaphragm of a tubular configuration extended between the annuli and characterized by a length dimension substantially greater than the distance of the spacing between said axes; and
    D. means for establishing in said diaphragm a rolling convolution at each of the opposite ends thereof as pivotal motion is imparted to the annuli about axes coincident with the crowns of the diaphragm.

14. The joint of claim 13 wherein said means for supporting the annuli includes a pair of rigid links pivotally connected to the annuli at opposite ends of the greatest diameter of each annulus of said pair of annuli, and said means for establishing in said diaphragm a rolling convolution at each of the opposite ends of the diaphragm thereof comprising a stand-off projected from each of the links and attached thereto near the midportion thereof for restraining the midportion of the diaphragm against displacement in axial directions relative to the annuli.

15. In an hermetically sealed pressure suit characterized by a brief section and a torso section of tubular configuration, a constant volume waist joint assembly comprising:
   A. a pair of axially spaced annuli, each being of a rigid, substantially elliptical configuration;
   B. a pair of rigid links extended in substantial parallelism between the annuli and pivotally connected to each annulus near the opposite ends of the greatest diameters thereof supporting said annuli for pivotal displacement about a pair of pivotal axes paralleling the diameters of the annuli and passing through the opposite end portions of said links;
   C. a flexible, substantially impermeable diaphragm of a tubular configuration spanning the distance between the annuli and connected thereto in an hermetically sealed relationship therewith and characterized by a length greater than the length of said links and having defined therein opposed rolling convolutions for accommodating pivotal displacement of said annuli; and
   D. means for maintaining in said diaphragm the opposed rolling convolutions as pivotal motion is imparted to said annuli, including a stand-off projected from each of said links and affixed to said diaphragm near the midportion thereof for restraining the midportion of the diaphragm against displacement in axial directions relative to said joint.

16. The waist joint assembly of claim 15 wherein said stand-off includes a curved plate having a radius approximating the radius of the adjacent portions of said annuli and the crowns of said convolutions are coincident with the pivotal axes of said annuli.

17. The waist joint assembly of claim 16 further comprising means for attaching one annulus of said pair of annuli to the brief portion of the suit, and means for attaching the other annulus of said pair to the torso section of the suit.

18. In an hermetically sealed pressure suit characterized by a tubular torso section having an arm opening provided therein and a movable arm section of a tubular configuration, a constant volume shoulder joint assembly comprising:
   A. a plurality of axially spaced, rigidly configured annuli, each being characterized by a pivotal axis extended in parallelism with the pivotal axis of each adjacent annuli;
   B. means including a pair of rigid links supporting each annulus of said plurality for pivotal displacement about the pivotal axis thereof;
   C. a plurality of flexible, substantially impermeable segments of diaphragm, each being of a tubular configuration spanning the distance between a pair of adjacent annuli and characterized by a length greater than the distance of the spacing between the annuli and having defined therein a rolling convolution including a crown; and
   D. retention means for maintaining in each segment of the diaphragm a rolling convolution as pivotal motion is imparted to the annuli.

19. The joint assembly of claim 18 wherein the crown of each convolution is maintained in coinciding relation with said pivotal axes as pivotal motion is imparted to the annuli.

20. The joint assembly of claim 18 further comprising a tubular body having defined therein a pair of abaxially aligned end openings disposed in intersecting planes, and annular bearing means connecting one annulus of said plurality of annuli to one end of said body and supporting the body for rotary displacement about the axis of symmetry of said one annulus.

21. The joint assembly of claim 20 further comprising:
   A. annular bearing means connecting the opposite end of the body to the arm section of the pressure suit in coaxial alignment therewith and supporting the arm section for rotary displacement about the axis of symmetry thereof; and
   B. annular bearing means connecting the shoulder joint assembly to the torso section of said suit in coaxial alignment with the arm opening and supporting the plurality of annuli for rotary displacement about the axis of symmetry for said arm opening.

22. In an hermetically sealed pressure suit characterized by a tubular torso section, having provided therein an arm opening, and a movable arm section of a segmented tubular configuration, a constant volume shoulder joint assembly comprising:
   A. a plurality of adjacently disposed, axially spaced annuli, each being of a rigid configuration and characterized by a pivotal axis extended in parallelism with the pivotal axes of remaining annuli of the plurality;
   B. means including a pair of rigid links extended in parallelism between each pair of adjacent annuli and pivotally connected thereto for supporting the annuli for pivotal displacement about the pivotal axes thereof;
   C. a plurality of flexible, substantially impermeable diaphragm segments, each being of a tubular configuration, spanning the distance between each pair of adjacent annuli and characterized by a length substantially equal to the greatest distance established between corresponding portions of the annuli of the pair when the annuli are displaced to the limits of the throw about the pivotal axes thereof;
   D. convolution forming means for establishing in one end of each diaphragm segment a rolling convolution characterized by a crown coincident with a pivotal axis of an adjacent annuli;
   E. an angulated tubular body;
   F. means including an annular bearing for rotatably connecting said shoulder joint assembly in suspension from said torso in substantial coaxial alignment with the arm opening, and means including an annular bearing for rotatably connecting the plurality of annuli to the angulated tubular body; and
   G. means including an annular bearing for rotatably connecting the tubular body with the movable arm section of the pressure suit.

23. In an hermetically sealed pressure suit having a segmented arm section characterized by an upper arm segment and a lower arm segment, a constant volume elbow joint assembly comprising:
  A. a first and a second subassembly, each being characterized by a pair of pivotal annuli, a tubular diaphragm extended between the annuli of the pair, and means for simultaneously forming in each of the opposite end portions of the diaphragm a rolling convolution as pivotal motion is imparted to the annuli; and
  B. a third subassembly interposed between the first and second subassemblies and connected thereto including a tubular body of an angulated configuration having a pair of end openings disposed in intersecting planes coaxially aligned with adjacent annuli of said first and second subassemblies.

24. The joint assembly of claim 23 wherein the convolutions formed in the opposite end portions of the web include opposed crowns coincident with the pivotal axes of the annuli which undergo rolling displacement in opposite directions as pivotal motion is imparted to the annuli.

25. In an hermetically sealed pressure suit having a segmented arm section characterized by an upper arm segment and a lower arm segment, a constant volume elbow joint assembly comprising:
  A. a first subassembly including,
    (1) a first pair of axially spaced annuli, each being of a rigid configuration,
    (2) means for supporting the annuli for pivotal displacement about parallel axes including a pair of rigid links extended in substantial parallelism between the annuli and pivotally connected thereto at opposite sides thereof,
    (3) a flexible, substantially impermeable diaphragm of a tubular configuration spanning the distance between the annuli and connected thereto at the opposite ends thereof, and
    (4) means for forming in the opposite end portions of the diaphragm oppositely rolling convolutions as pivotal motion is imparted to said annuli, including a stand-off projected from each of the links and affixed to a midportion of the diaphragm;
  B. a second subassembly connected to said first subassembly including a tubular shell having a pair of end openings arranged in intersecting planes; and
  C. a third subassembly connected to said second subassembly including,
    (1) a first pair of axially spaced annuli, each being of a rigid configuration,
    (2) means for supporting the annuli for pivotal displacement about parallel axes including a pair of rigid links extended in substantial parallelism between the annuli and pivotally connected thereto at opposite sides thereof,
    (3) a flexible, substantially impermeable diaphragm of a tubular configuration spanning the distance between the annuli and connected thereto at the opposite ends thereof, and
    (4) means for forming in the opposite end portions of the diaphragm oppositely rolling convolutions as pivotal motion is imparted to said annuli, including a stand-off projected from each of the links and affixed to a midportion of the diaphragm.

26. The elbow joint assembly of claim 25 wherein the axes are coincident with the crowns of the convolutions.

27. The joint assembly of claim 26 wherein each rolling convolution undergoes simultaneous opposed displacement as pivotal motion is imparted to the annuli.

28. In an hermetically sealed pressure suit characterized by a tubular brief section having provided therein a leg opening and a movable leg section of a segmented tubular configuration, a constant volume hip joint assembly comprising:
  A. a first subassembly including a tubular shell of a flexible material having an angulated configuration including a pair of end openings disposed in intersecting planes;
  B. a second subassembly connected with said first subassembly in coaxial alignment with one end opening of said pair of end openings comprising a pair of axially spaced annuli, each being of a rigid configuration, means for supporting the annuli for pivotal displacement about axes arranged in parallelism including a pair of rigid links extended in substantial parallelism between the annuli and pivotally connected thereto, a flexible, substantially impermeable diaphragm of a tubular configuration spanning the distance between the annuli and connected thereto at the opposite ends thereof, and means for forming in each of the opposite end portions of the diaphragm a rolling convolution as pivotal motion is imparted to said annuli, including a stand-off projected from each of the links and affixed to a midportion of the web; and
  C. means including an annular bearing rotatably connecting the first subassembly with the brief section of the pressure suit, with the opposite end opening of said pair of end openings being disposed in coaxial alignment with the leg opening of the brief section, and means including an annular bearing adapted to rotatably connect the second subassembly to an adjacent segment of the leg section of the pressure suit in coaxial alignment therewith.

29. In an hermetically sealed pressure suit having a segmented leg section of a tubular configuration and a walking boot disposed at one end of the leg section, means including an ankle joint assembly for connecting the walking boot with the leg section comprising:
  A. a flexible, substantially impermeable diaphragm of a tubular configuration spanning the distance between the leg section and the boot, and connected thereto at the opposite ends thereof;
  B. a first annulus connected to said leg section and a second annulus connected to said walking boot;
  C. a gimbal assembly interconnecting said first annulus and said second annulus supporting said boot for pivotal displacement about orthogonally related axes; and
  D. means for forming in each of the opposite end portions of the diaphragm a rolling convolution as pivotal motion is imparted to said second annulus.

30. In an hermetically sealed pressure suit having a segmented leg section of a tubular configuration and a walking boot disposed in a spaced relationship with one end of the leg section, an ankle joint assembly for connecting the boot with the leg section comprising:
  means defining a gimbal system interconnecting the walking boot with said segmented leg section supporting said boot for simultaneous angular displacement about a pair of orthogonal axes.

31. The ankle joint assembly of claim 30 further comprising:

A. means for hermetically sealing the walking boot to the leg section including a flexible, substantially impermeable diaphragm of a tubular configuration spanning the distance between the leg section and the boot and having a length substantially greater than the distance between the leg section and the boot; and B. means for forming in each of the opposite end portions of the diaphragm a rolling convolution having a crown coincident with said axes as angular displacement is imparted to said boot.

32. The ankle joint assembly of claim 31 wherein said means defining said gimbal system comprises:

A. a first annulus of a rigid configuration attached to said leg section in coaxial alignment therewith and supported for pivotal displacement about a first axis coincident with a diameter thereof;

B. a second annulus of a rigid configuration attached to said walking boot in axially spaced relation with said first annulus and supported for pivotal displacement about a second axis arranged in coplanar relation with said first axis and coincident with a diameter of said second annulus; and C. connecting means pivotally supporting the first and second annulus for pivotal displacement about a pair of axes disposed in a common plane normally related to the plane of said first and second axes.

33. In an hermetically sealed pressure suit characterized by a tubular leg segment having a first leg opening and a walking boot having a second leg opening coaxially alignable with said first opening, an ankle joint assembly connecting said walking boot to said leg segment comprising:

A. a first annulus of a rigid configuration mounted on one end portion of the leg segment in coaxial relation with said first leg opening;

B. a second annulus of a rigid configuration mounted on said boot in coaxial relation with said second leg openings;

C. a third annulus having a diameter slightly less than the diameter of said first annulus and concentrically related thereto;

D. a fourth annulus having a diameter slightly less than said second annulus and concentrically related thereto;

E. first bearing means pivotally connecting the third annulus with said first annulus and supporting the third annulus for pivotal displacement about a first pivotal axis coincident with a diameter of said first annulus and extending in parallelism with the longitudinal axes of the boot;

F. second bearing means pivotally connecting the fourth annulus with said second annulus and supporting the fourth annulus for pivotal displacement about a second pivotal axis paralleling said first pivotal axis;

G. a pair of rigid links extended in mutual parallelism between the third and fourth annuli;

H. bearing means for pivotally connecting the first ends of the links to said third annulus for supporting the third annulus for pivotal displacement about a third pivotal axis normally related to said first axis, and bearing means for pivotally connecting the opposite ends of the links to said fourth annulus for supporting the fourth annulus for pivotal displacement about a fourth axis paralleling the third axis and normally related to the longitudinal axis of the boot;

I. means for hermetically sealing the boot to the leg segment including a flexible, substantially impermeable diaphragm of a tubular configuration spanning the distance between the first and second annuli and characterized by a length substantially greater than the distance therebetween; and J. means for forming in each of the opposite end portions of the diaphragm a rolling convolution having components of opposed displacement as pivotal motion is imparted to said second annulus, including a stand-off projected radially from each of said links and affixed to said diaphragm near the midportion thereof for restraining said midportion of the diaphragm from displacement in axial directions for suporting the crown of each convolution in a fixed relationship with said pivotal axes.

* * * * *